United States Patent [19]
Perreault et al.

[11] Patent Number: 5,805,994
[45] Date of Patent: Sep. 8, 1998

[54] METHOD FOR TRANSMIT POWER CONTROL IN A COMMUNICATION SYSTEM

[75] Inventors: John A. Perreault, Hopkinton; David R. Flanagan, Framingham; Katherine A. Unger, Wrentham, all of Mass.

[73] Assignee: Motorola, Inc., Schaumburg, Ill.

[21] Appl. No.: 624,346

[22] Filed: Apr. 3, 1996

[51] Int. Cl.⁶ .............................. H04Q 7/20; H04B 7/00
[52] U.S. Cl. ....................... 455/435; 455/522; 455/69
[58] Field of Search ................... 455/33.2, 54.1, 455/54.2, 56.1, 69, 67.1, 67.3, 88, 422, 63, 501, 507, 522, 435, 68; 379/60

[56] References Cited

U.S. PATENT DOCUMENTS

| | | | |
|---|---|---|---|
| 4,653,114 | 3/1987 | Berman | 455/69 |
| 5,204,970 | 4/1993 | Stengel et al. | 455/69 |
| 5,345,596 | 9/1994 | Buchenhorner et al. | 455/54.2 |
| 5,430,760 | 7/1995 | Dent | 455/54.2 |
| 5,465,399 | 11/1995 | Oberholtzer et al. | 455/69 |
| 5,586,121 | 12/1996 | Moura et al. | |

*Primary Examiner*—Nguyen Vo
*Attorney, Agent, or Firm*—Nancy R. Gamburd; Jeffrey T. Klayman

[57] ABSTRACT

A plurality of secondary stations ($10_a$ through $10_n$) are coupled to a primary station (8) by way of a shared communication medium (15, 16). The secondary stations ($10_a$ through $10_n$) sends information to the primary channel on the upstream channel. The primary station sending information to the secondary stations ($10_a$ through $10_n$) on a downstream channel. The power level of a secondary station ($10_n$) is set at the power level stored in secondary station memory (55). The secondary station ($10_n$) transmits a message to the primary station on the upstream channel. The primary station (8) receives the message, determines the power level of the received message, and sets the power level of the secondary device to the nominal power level.

11 Claims, 6 Drawing Sheets

METHOD FOR TRANSMIT POWER CONTROL IN A COMMUNICATION SYSTEM

FIELD OF THE INVENTION

This invention relates, in general, to data communication and data communication systems and devices and, more specifically, to an apparatus and method for adjusting the transmit power level of a transmitting device in a communication system.

BACKGROUND OF THE INVENTION

With the advent of multimedia communications, data transmission has become increasingly complex. For example, multimedia communication applications such as real time transmission of digitally encoded video, voice, and other forms of data, may require new forms and systems for data communication and data transmission. In some systems, a hybrid optical fiber and coaxial cable is utilized to provide substantial bandwidth over existing cable lines to secondary stations such as individual, subscriber access units, for example, in households having new or preexisting cable television capability. These coaxial cables are connected to fiber optical cables to a central location having centralized, primary (or "head end") controllers or stations. Such primary equipment may be connected to any variety of networks or other information sources, such as the Internet, various on line services, telephone networks, and video/movie subscriber service. Data may be transmitted both in the downstream direction, from the primary station or controller (connected to a network) to the secondary station of an individual user (subscriber access unit), and in the upstream direction, from the secondary station to the primary station (and to a network).

In such a system, downstream data may be transmitted using 64 quadrature amplitude modulation ("QAM") at a rate of 30 M bps (megabits per second), over channels having 6 MHz (megahertz) bandwidth in the frequency spectrum of 50–750 MHz, and potentially up to 1 GHz (gigahertz). Less capacity may be provided for upstream data transmission, using $\pi/4$ differential quadrature phase shift keying ($\pi/4$-DQPSK) modulation in the frequency band from 5–42 MHz with a symbol rate of 384 thousand symbols/sec with 2 bits/symbol. In addition, the communication system is designed to have a multipoint configuration, i.e., many secondary stations (also referred to as subscriber access units) transmitting upstream to a primary station, with one or more primary stations transmitting downstream to the secondary stations. The communication system is also designed for asynchronous transmission, with users transmitting and receiving packets of encoded data, such as video or text files. In addition, transmission may be bursty, with various users receiving or transmitting data at indeterminate intervals over selected channels in response to polling, contention, or other protocols from the primary station, rather than transmitting a continuous and synchronous stream of information over a dedicated or circuit switched connection.

As secondary stations are powered up, enter the communication (or communications) system or network, or otherwise come on line, each secondary station should transmit at a power level sufficient to have a nominal power level at the primary station. Use of a transmit power level by a secondary station that is too low results in the inability of the primary station to receive properly transmissions from the secondary station. Use of a transmit power level by a secondary station that is too high results in the inability of the primary station to properly receive transmissions sent by the secondary station, and may result in interference on other channels. A problem arises because the secondary station may not know the predetermined or adaptive optimal power level without actually transmitting information first to the primary station so that the power level can be measured at the primary station to determine whether the secondary station transmit power level is appropriate.

Other approaches to this problem have generally provided for a predetermined, fixed transmit power level designated for initial start up, such as a hardware or software encoded transmit power level selection. Still other approaches have required user intervention, for example, direct configuration of the device by the user or installer during the start up operation. Another approach requires high-cost components to be used which are capable of overcoming the variability.

Utilization of a fixed or predetermined transmit power level, however, does not provide for system flexibility, particularly under variable conditions. For example, each secondary station may be required to transmit at a different power level due to its relative distance from the primary station, differences in the cabling and connectors, variance in the components, environmental changes, and changes in the communication medium for the purpose of maintenance or upgrading.

Further, in a communications system that supports a plurality of frequency channels, the transmit power level for a secondary station may need to be adjusted depending on which channel of the plurality of channels is to be used. Direct user intervention may not be feasible, as the user must have access to up-to-date information concerning each of the factors described above that may affect the transmit power level setting. The use of high-cost components, or low-cost components which result in inefficient use of the medium, are not feasible in communication systems that have relatively large numbers of users and a capacity-limited medium.

As a consequence, a need exists for an apparatus and method to quickly and reliably determine the appropriate power level for transmission of information, without user intervention, while simultaneously providing maximum flexibility to accommodate the variable factors that affect transmission between the secondary stations and the primary station.

DETAILED DESCRIPTION OF THE INVENTION

A need exists for an apparatus and method to provide for quick and reliable setting of a secondary station's power level for transmission of data and other information from the secondary station to the primary station, without utilizing a predetermined or fixed value, without user intervention, and without actual prior knowledge of the transmit power level setting. The apparatus and method in accordance with the present invention provides such quick and reliable setting of transmit power level, without utilization of a fixed value or user intervention. As a consequence, the apparatus and method of the present invention enable increased communication system agility, flexibility and ease of use, particularly under conditions where there are large numbers of secondary stations. Efficient utilization of the medium is attained and variation in the effect of the environment on the medium's ability to pass information is minimized.

Figure 1:
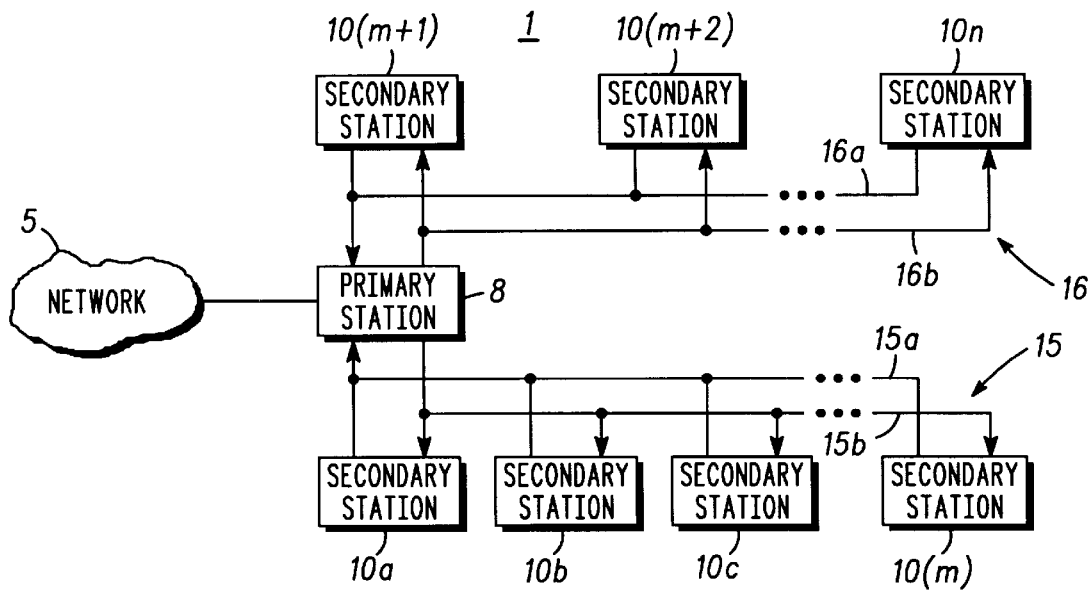
FIG. 1 is a block diagram illustrating a communication system.

FIG. 1 is a block diagram illustrating a communication system 1 in accordance with the present invention. As illustrated in FIG. 1, a primary station 8, also referred to as a primary device or primary transceiver unit, is coupled to a plurality of secondary stations $10_a$ through $10_n$, via communications media 15 and 16. In the preferred embodiment, communications media 15 and 16 are hybrid optical fiber and coaxial cable. In other embodiments, the communication media may be coaxial cable, fiber optic cable, twisted pair wires, and so on, and may also include air, atmosphere or space for wireless and satellite communication. The primary station 8 is also coupled to a network 5, which may include networks such as the Internet, on line services, telephone and cable networks, and other communication systems. The secondary stations $10_a$ through $10_n$ are illustrated in FIG. 1 as connected to the primary station 8 on two segments or branches of a communications medium, such as communications media 15 and 16. Equivalently, the secondary stations $10_a$ through $10_n$ may be connected to more than one primary station, and may be connected to a primary station (such as primary station 8) utilizing more or fewer branches, segments or sections of any communication medium.

Continuing to refer to FIG. 1, in the preferred embodiment, the communications medium, such as communications media 15 and 16, may have a plurality of channels (equivalently referred to as communications channels). The communication media 15,16 each have an upstream channel 15a, 16a and a downstream channel 15b, 16b.

For ease of reference, the communications channels in which a primary station, such as the primary station 8, transmits information, signals, or other data to a secondary station, such as secondary station $10_n$, are referred to as downstream channels or downstream communication channels. Also for ease of reference, the communications channels in which a secondary station, such as secondary station $10_n$, transmits information, signals, or other data to a primary station, such as primary station 8, are referred to as upstream channels or upstream communication channels. These various upstream and downstream channels may, of course, be the same physical channel or may be separate physical channels, for example, through time division multiplexing or frequency division multiplexing. These various channels may also be logically divided in other ways, in addition to upstream and downstream directions. The communications medium is hybrid fiber coaxial cable, with downstream channels in the frequency spectrum (band) of 50–750 MHz, and with upstream channels in the frequency spectrum of 5–42 MHz.

Figure 2:
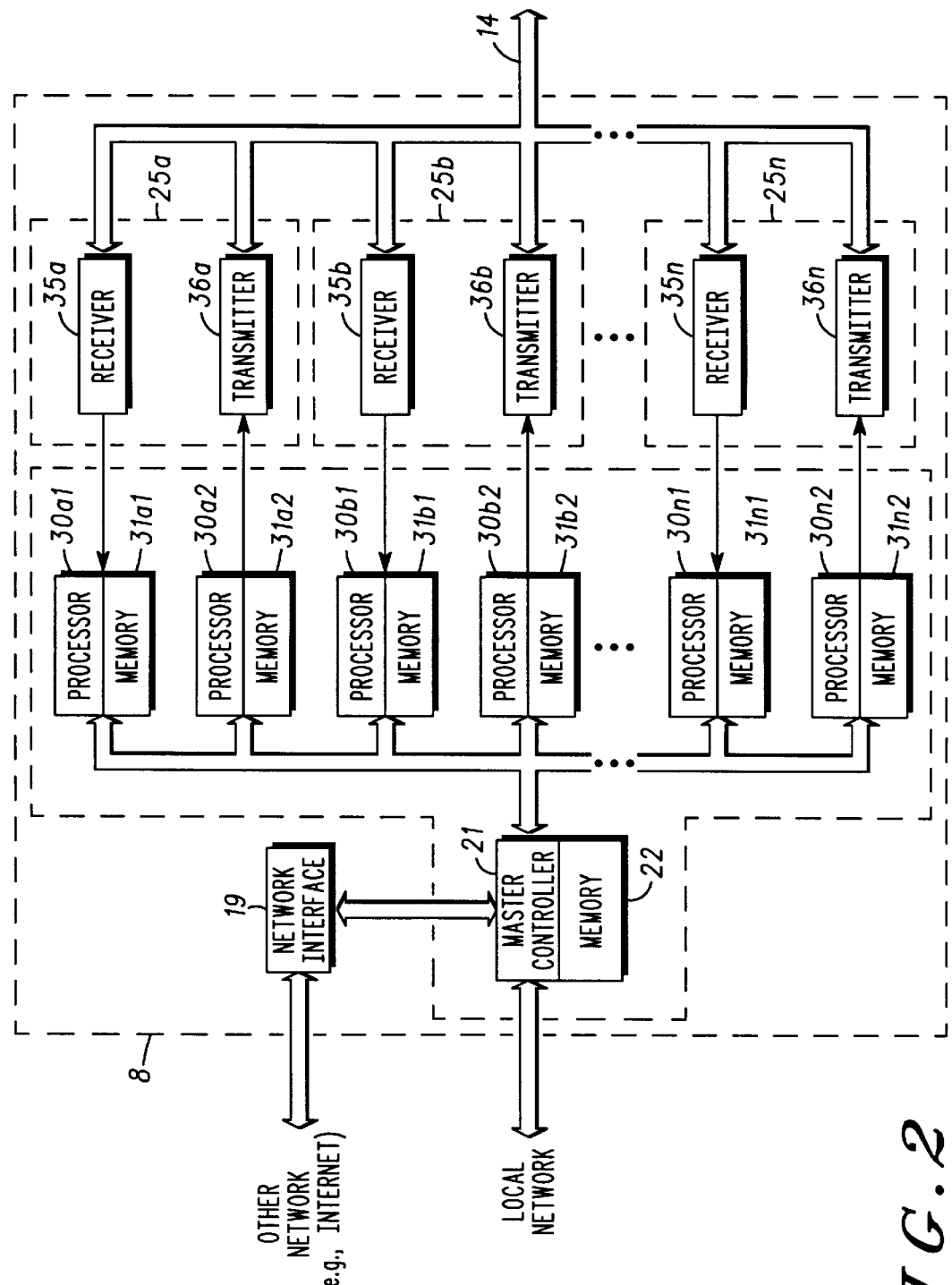
FIG. 2 is a block diagram illustrating a primary station apparatus.

FIG. 2 is a block diagram illustrating a primary station 8 in accordance with the present invention. The primary station 8 is coupled to a communication medium 14 for upstream and downstream communication to one or more secondary stations (not illustrated), and may be connected to a network, such as the Internet, through a network interface 19. The primary station includes a processor arrangement 20 which is connected to a plurality of channel interfaces, channel interface $25_a$ through channel interface $25_n$, for communication over the communication medium 14. The processor arrangement 20 includes a master controller 21 having or connected to memory 22, and one or more additional processors $30_{a1}$ through $30_{n2}$ and corresponding associated memories $31_{a1}$ through $31_{n2}$. In the preferred embodiment, the master controller 21 is a Motorola M68040 processor, and the memory 22 is 16 megabytes (MB) of random access memory (RAM). The master controller 21 performs a variety of higher level functions in the preferred embodiment, such as spectrum management, routing functions, management of secondary stations, and communication protocol management (such as SNMP (simple network management protocol) management). The master controller 21 is connected to a plurality of other processors, collectively referred to as processors 30 and separately illustrated as processor $30_{a1}$, processor $30_{a2}$, through processor $30_{n1}$ and processor $30_{n2}$. Each of these processors, processor $30_{a1}$, processor $30_{a2}$, through processor $30_{n1}$ and processor $30_{n2}$, is also coupled to or contains corresponding memory circuits, memory $31_{a1}$, memory $31_{a2}$, through memory $31_{n1}$ and memory $31_{n2}$. In the preferred embodiment, each of these processors 30 are also Motorola M68040 processors, while the corresponding memory circuits, memory $31_{a1}$ through memory $31_{n2}$, are 4 MB RAM.

In the preferred embodiment, the processors 30 perform such functions related to upstream and downstream data protocols, such as sending downstream a poll message, an acknowledgment message, or as pertaining to the present invention, transmitting a message downstream which contains a listing of identifications of secondary stations allowing specified secondary stations to communicate upstream, as discussed in greater detail below with reference to FIG. 4 through FIG. 7. Should the apparatus and method of the present invention be utilized in the primary station 8, for some type of primary station transmit power leveling, the apparatus and method would be embodied within the processor arrangement 20, as a set of program instructions, in a manner equivalent to its incorporation in the various secondary stations discussed below.

Continuing to refer to FIG. 2, each of these processors $30_{a1}$ through $30_{n2}$ of the processor arrangement 20 are connected to corresponding receivers and transmitters of the channel interfaces, channel interface $25_a$ through channel interface $25_n$ (collectively referred to as channel interfaces 25), namely, receiver $25_a$ through receiver $35_n$ (collectively referred to as receivers 35) and transmitter $36_a$ through transmitter $36_n$ (collectively referred to as transmitters 36). As a consequence, as used herein, the channel interfaces 25 may be considered to perform the functions of data and other signal reception and transmission, regardless of the specific hardware implementations and additional functions which may or may not be implemented. The various memories illustrated, such as memory 22 or $31_{a1}$, may also be embodied or contained within their corresponding processors, such as master controller 21 or processor $30_{a1}$. In addition, the various memories illustrated, such as memory 22 or $31_{a1}$, similarly to memory 55 discussed with reference to FIG. 3, may also contain different types of memory, implemented in commercially available integrated circuits, such as random access memory, non-volatile memory, and flash-type memory.

In the preferred apparatus embodiment illustrated in FIG. 2, the transmit power leveling method discussed below with reference to FIGS. 4 and 5 may be programmed and stored, as a set of program instructions for subsequent execution, in the processor 30 and memory 31 and the master controller 21 and the memory 22 of a primary station 8. Information concerning which secondary stations (not illustrated) attached to the communication medium 14 for upstream and downstream communication have previously been registered, and therefore had transmit power level set, are stored in one or both memories 31 and 22. To the extent that any downstream primary station transmit power leveling capability is necessary or desirable, a similar transmit power level method may be programmed and stored, also as a set of program instructions for subsequent execution, in the secondary stations $10_a$ through $10_n$ illustrated in FIG. 3 and, more particularly, in the processor 50 and the associated memory 55.

Figure 3:
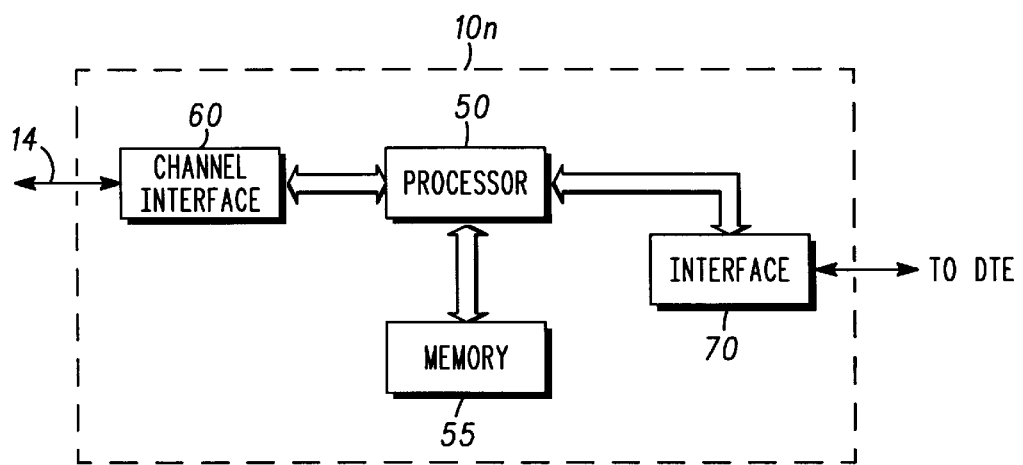
FIG. 3 is a block diagram illustrating a secondary station apparatus.

FIG. 3 is a block diagram illustrating a representative secondary station, such as secondary station $10_n$, in accordance with the present invention. The secondary station $10_n$ includes a processor (or processor arrangement) 50, with the processor 50 having or coupled to a memory 55. In the preferred embodiment, the processor 50 is a Motorola M68302 processor (also known as an integrated multiprotocol processor), and the memory 55 is 256 K RAM. The processor 50 is coupled to an interface 70, such as an ethernet port or an RS232 interface, for connection to a computer, a workstation, or other data terminal equipment ("DTE"). The processor 50 is also coupled to a channel interface 60 for communication over the communication medium 14. The channel interface 60 performs such functions as forward error correction encoding and decoding, QAM demodulation (for downstream reception), DQPSK modulation (for upstream transmission), transmit level and frequency adjustment, for data and other signal reception and transmission. As a consequence, as used herein, the channel interface 60 may be considered to perform the functions of data and other signal reception and transmission, regardless of the specific hardware implementations and additional functions which may or may not be implemented. The memory illustrated as memory 55 may also be embodied or contained within the corresponding processor 50. In the preferred embodiment, the memory 55 includes, as separate integrated circuits ("ICs"), three types of memory, namely, random access memory, non-volatile memory, and flash memory, which may be implemented utilizing known, commercially available ICs. Also in the preferred embodiment, the processor (or processor arrangement) 50 performs the functions of transmit power leveling, for determining the appropriate power level to use to transmit messages to the primary station, and the channel interface 60 transmits messages at the power level determined by the processor (or processor arrangement) 10, in accordance with the present invention, as described in greater detail below. As the appropriate transmit power level is determined, or adjusted over time, a listing or other record of these previous transmit power levels is stored in the non-volatile portion of the memory 55, also as described in greater detail below.

In the preferred apparatus embodiment illustrated in FIG. 3, the transmit power leveling method discussed below with reference to FIGS. 6 and 7 may be programmed and stored, as a set of program instructions for subsequent execution, in the processor 50 and memory 55 of a secondary station, such as secondary station $10_n$ illustrated in FIG. 3. Information concerning transmit power levels that a secondary station $10_n$ has previously used, or default transmit power level values on initial system start up, are stored in memory 55. To the extent that any downstream primary station transmit power leveling capability is necessary or desirable, a similar transmit power level method may be programmed and stored, also as a set of program instructions for subsequent execution, in the primary station 8 illustrated in FIG. 2 and, more particularly, in each of the processors 30 (with their associated memories 31), utilizing QAM encoding performed by the corresponding transmitters 36 (instead of π/4-DQPSK encoding).

In the preferred embodiment, as the secondary stations (collectively referred to as secondary stations $10_n$) are powered up or otherwise come on line in the communication system 1, each secondary station $10_n$ needs to determine at what power level to transmit information or other data via the primary station 8. In the preferred embodiment, each secondary station $10_a$ through $10_n$ contains a default transmit power level setting in the non-volatile portion of its memory 155, which is set to the lowest possible value the first time that the secondary station attempts to transmit to a primary station, and the default is modified as described in detail below when successful transmission to the primary station occurs.

To facilitate such transmit power leveling, in the preferred embodiment, the primary station 8 will periodically transmit or signal, as a broadcast to all secondary stations $10_a$ through $10_n$ assigned to a particular channel, a poll or other message containing a listing or equivalent specification, by serial number or other means of identification, of each secondary station assigned to that particular channel. When a secondary station $10_n$ detects a broadcast on a particular downstream channel containing its identifier, such as a serial number identification, then the secondary station $10_n$ is allowed to transmit on an upstream channel.

As stated above, the broadcast message may indicate one or more secondary station identifiers. In the case where more than one secondary station $10_a$ through $10_n$ is specified in the broadcast message, more than one secondary station may respond resulting in a collision of their transmissions. When more than one secondary station identifier is included in the downstream broadcast, there is no way to distinguish between a collision and a single secondary station responding with an incorrectly set transmit power level, since either case results in an invalid message being received by the primary station 8, with some power level associated with the received message. Therefore, the primary station 8 assumes this to be a collision.

The collision resolution process systematically reduces the number of secondary stations contained in the downstream broadcast, if necessary, until only one secondary station identifier is contained in the downstream broadcast. The collision resolution process provides all secondary stations $10_a$ through $10_n$ that were potentially involved in the collision the opportunity to respond, one at a time if necessary.

If an invalid message is received by the primary station 8 when only one secondary station $10_n$ was contained in the downstream broadcast, then it can be inferred that (as long as the medium is otherwise functioning properly) the transmit power level of the transmitting secondary station $10_n$ is set either too high or too low. In this case in the preferred embodiment, the secondary station $10_n$ infers that its transmit power level is too low, and increases it up to, but not exceeding, a predetermined or adaptive maximum value. Upon further such failures after reaching a predetermined or adaptive maximum value, adjusts the transmit power level to a predetermined or adaptive minimum value.

Alternatively, the primary station 8 may actually measure the received power level associated with the invalid message received from the specified secondary station, and determine how much the transmit power level of the transmitting secondary station should be increased or decreased.

In either case, the transmit power level can be adjusted based on the fact that a single secondary station $10_n$ transmitted a message one or more times on an otherwise properly functioning medium, and the message was not received properly. Further, when a secondary station $10_n$ detects a broadcast on a particular downstream channel containing its identifier, such as a serial number identification, and the secondary station $10_n$ transmits a response on an otherwise properly functioning upstream channel, and then does not receive notification of either proper or improper reception by the primary station 8, the secondary station $10_n$ may infer that its transmit power level is set too low since nothing was received by the primary station 8. In this case, the secondary station $10_n$ increases its transmit power level by some predetermined or adaptive value prior to transmitting again, up to, but not exceeding, a predetermined maximum value, and upon further such failures after reaching a predetermined maximum value, adjusts the transmit power level to a predetermined minimum value.

Once the transmit power level of a secondary station $10_n$ is set close enough to a predetermined or adaptive optimal level for its transmissions to be received properly by the primary station 8, the primary station 8 may measure the power level associated with received messages and "fine tune" adjust the secondary station's $10_n$ transmit power level as necessary. Finally, once a secondary station $10_n$ is able to successfully transmit messages to the primary station 8, the most recently successfully used transmit power level may be stored in non-volatile memory for use as the default value to use the next time the power-up transmit power leveling process takes place. Alternatively, the primary station 8 could include in the downstream broadcast the predetermined or adaptive minimum, maximum, and default transmit power level value to be used by the secondary station, obviating the need for this information .(i.e., the default, maximum, and minimum transmit power level values) in the secondary station $10_n$. The apparatus and method of the invention provide for rapid and accurate transmit power leveling, enabling a secondary station $10_n$ to immediately use a transmit power level which has a higher likelihood of resulting in successful reception of messages by the primary station, without user intervention and, in most cases, without adversely affecting other frequency channels that may be in use. In addition, while the preferred embodiment utilizes signaling in a link layer through specific poll or broadcast messages, such signaling may be performed at any layer in a communication protocol, including the physical layer, the network layer, or in a software download (from a primary station 8 to a secondary station $10_n$).

Figure 4:
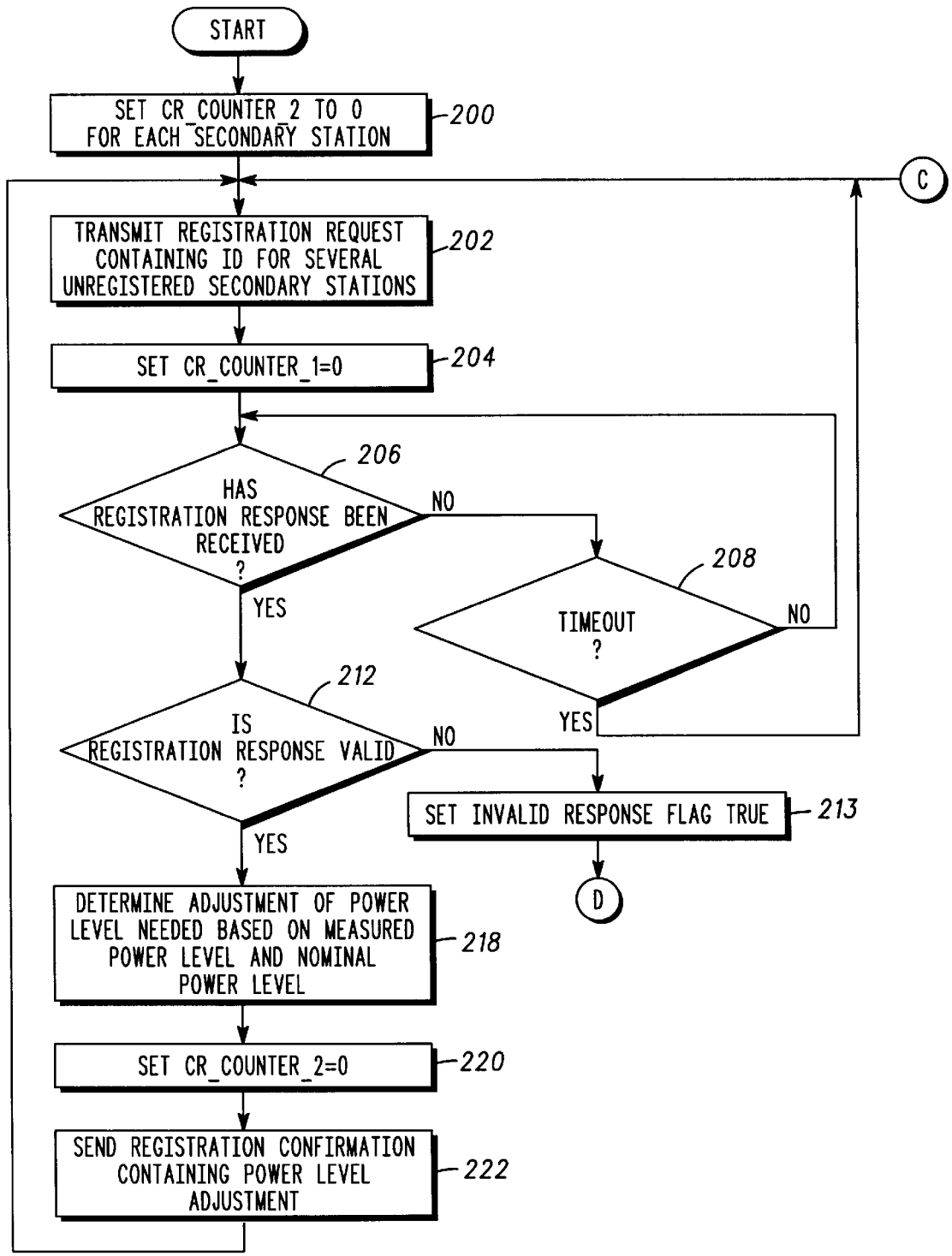
FIG. 4 is a flow chart illustrating the primary station portion of the method of transmit power leveling.

FIG. 4 is a flow chart illustrating the primary station 8 portion of the method of transmit power leveling in accordance with the present invention. Beginning with start (step 200), the CR_COUNTER_2 for each secondary station $10_a$ through $10_n$ is set to 0. The CR_COUNTER_2 is a variable maintained at the primary station 8 that contains the number of times the primary station 8 detects that a specific individual secondary station $10_n$ has failed to register when it was the only secondary station trying to register. Use of CR_COUNTER_2 is described in more detail below. The primary station 8 then sends a registration request message containing the serial numbers of several unregistered secondary stations, (step 202). Unregistered stations are those secondary stations $10_a$ through $10_n$ that have not completed a required handshake with the primary station 8. The handshake is as at least one step in a plurality of steps for the purpose of allowing or disallowing the secondary station $10_n$ to utilize the communication system. Only those secondary stations $10_a$ through $10_n$ that are unregistered actually process these registration request messages. Once a secondary station $10_n$ is registered it no longer looks for these messages.

The registration request is a downstream broadcast message. The variable CR_COUNTER_1 is set to zero (step 204). CR_COUNTER_1 is a variable maintained by the primary station 8 representing the number of consecutive times that the primary station 8 has sent a registration request to a single secondary station $10_n$ and received an invalid response. Use of CR_COUNTER_1 is described in more detail below. The primary station 8 waits for a registration response (step 206). If no response is received, then the primary station 8 determines if the response has timed out (step 208). If not, the primary station continues looking for a response (step 206). If no response has been received and a timeout has occurred, then a new registration request is generated (step 202).

Continuing to refer to FIG. 4, whenever a message is received, the measured power level of the received message as well as the information content of the message is captured. If a registration response is received, then the registration response is checked to determine whether the response was valid (step 212). If the registration response is valid, the primary station 8 determines the amount that the transmit power level of the secondary station $10_n$ should be adjusted based on the measured power level and a predetermined or adaptive optimal value (step 218). Then, CR_COUNTER_2 for the secondary station $10_n$ that responded is set to 0, since the response was valid (step 220). The registration confirmation message, containing the transmit power level adjustment that was calculated (step 218), is sent to the secondary station (step 222), and control passes back to step 202, and the process repeats. If the registration response is not valid (step 212), then the invalid response flag is set to TRUE (step 213), and control passes to "D" (step 214) and continues as shown in FIG. 5.

Figure 5:
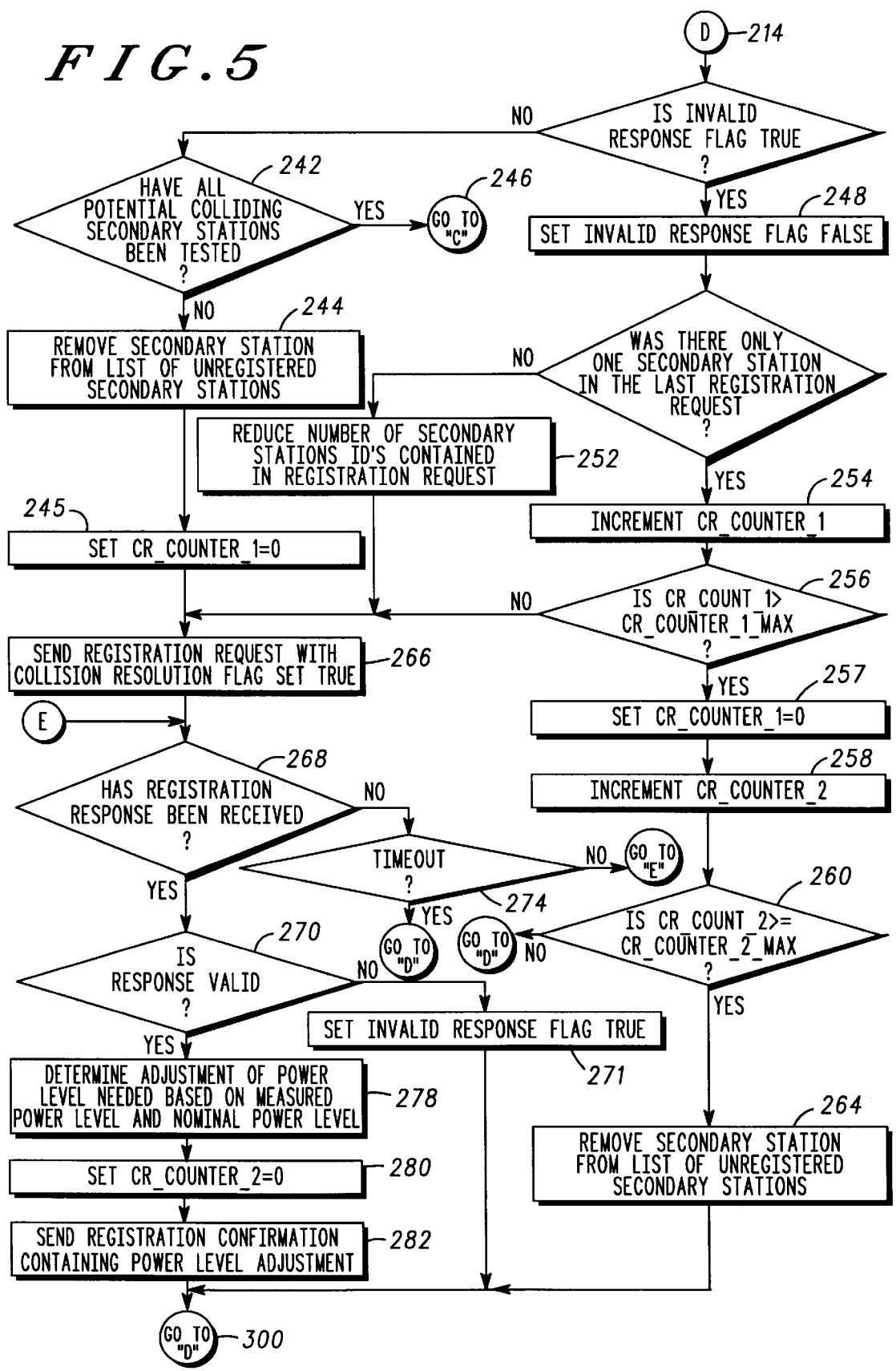
FIG. 5 is a flow chart illustrating the continuation of the primary station portion of the method of transmit power leveling.

FIG. 5 shows the operation of the primary station 8 when an invalid response to a registration request is received, i.e., there has been a potential collision, between two or more of the plurality of secondary stations $10_a$ through $10_n$, that must be resolved.

In the preferred embodiment, the collision resolution method is a known tree-splitting approach, where the set of secondary station identifiers (the root) involved in a (potential) collision is split into smaller subsets (branches), and each subset is sent in a registration request message with the collision resolution flag set to TRUE, and further if an invalid response is received to a registration request message with the collision resolution flag set to TRUE that contains a subset, that subset is further divided into smaller subsets and each of those subsets is sent in a registration request message with the collision resolution flag set to TRUE.

When no response is received or a good response is received, then the next subset is used in a registration request with the collision resolution flag set to TRUE. This process continues until the complete original set of secondary station identifiers (the root) has been sent and either no response or a good response is received. At that point, all collisions have been resolved and the collision resolution process terminates. While this process is not described in detail in FIG. 5, it is apparent that such a process can be used for the purpose of collision resolution, as well as other alternative approaches which also could be used.

Referring again to FIG. 5, the invalid response flag is checked (step 240). If the invalid response flag is not TRUE, then an invalid response was not received, and a check is made to determine if all secondary station identifiers that were in the original registration request message (i.e., the root) have been sent in registration request messages with the collision resolution flag set to TRUE (step 242). If all have been sent, then the collision resolution process is complete and control then passes to "C" (step 246), which is shown in FIG. 4, step 210. If all secondary station identifiers that were in the original registration request message (i.e., the root) have not been sent in registration request messages with the collision resolution flag set to TRUE (step 242), then the next subset of secondary station identifiers is selected (step 244), CR_COUNTER_1 is set to zero (step 245) and control passes to step 266 described below. If the invalid response flag is TRUE (step 240), then an invalid response was received, so the invalid response flag is reset to FALSE (step 248), and the primary station 8 determines whether there was only one secondary station identifier in the previous registration request (step 250). If not, it is assumed there was a collision and some secondary station identifiers are removed from the registration request (step 252), creating a subset of secondary station identifiers.

In the preferred embodiment, the number of secondary stations $10_a$ through $10_n$ is divided by eight, rounded up (e.g., the sequence of registration request messages with the collision resolution flag set may contain 128 secondary station identifiers, then 16, then 2, then 1). The number of secondary stations $10_a$ through $10_n$ could vary with alternative implementations of a collision resolution procedure. If there was only one secondary station identifier in the previous registration request (step 250), then CR_COUNTER_1 is incremented (step 254). If CR_COUNTER_1 is greater than a maximum value for CR_COUNTER_1 (shown in FIG. 5 as CR_COUNTER_1_MAX) (step 256), then CR_COUNTER_1 is reset to zero (step 257), and CR_COUNTER_2 is incremented (step 258) for the specific secondary station $10_n$ that was the only one contained in the previous registration request. CR_COUNTER_1_MAX is used to ensure that other secondary stations $10_a$ through $10_n$ get the opportunity to access the upstream medium within a reasonable amount of time, dependent of course on what applications may be running over the medium. CR_COUNTER_2 is then compared to a predetermined or adaptive maximum amount, CR_COUNTER_2_MAX (step 260). CR_COUNTER_2_MAX is used to detect when the entire range of possible transmit power level settings has been tried once, or alternatively some number of times, but the secondary station $10_n$ is still unable to communicate successfully with the primary station. If CR_COUNTER_2 is less than a maximum amount (shown as CR_COUNTER_2_MAX), then control passes immediately to "D" (step 214).

On the other hand, if CR_COUNTER_2 is greater than or equal to CR_COUNTER_2_MAX, then the secondary station $10_n$ is removed from the list of unregistered secondary stations (step 264), and control then passes to "D" (step 214). The effect of removing the secondary station $10_n$ from the list of unregistered secondary stations is that registration of that secondary station becomes impossible. Presumably, some problem at the secondary station $10_n$ has made registration of that secondary station impossible. Alternatively, rather than remove the secondary station $10_n$ from the list of unregistered stations, the CR_COUNTER_2 may be reset, an alarm may be generated indicating that the secondary station is malfunctioning, and the secondary station $10_n$ may be allowed to try to register again.

Continuing to refer to FIG. 5, returning to step 266, the next subset of secondary station identifiers have been selected for the registration request (step 244), the set of secondary station identifiers has been reduced (step 252), or CR_COUNTER_1 was less than or equal to CR_COUNTER_1_MAX (step 256), then a registration request is sent with the collision resolution flag set to TRUE (step 266). If a registration response has not been received (step 268), and a timeout has not occurred (step 274), the primary station 8 continues to wait for a response (step 268) or timeout (step 274) to occur. If a registration response has not been received (step 268), and a timeout has occurred (step 274), then control immediately passes to "D", step 214. If a registration response has been received (step 268), and if that response is valid (step 270), then the primary station 8 determines the amount of adjustment for the transmit power level of the secondary station $10_n$, based on the measured power level of the registration response message and a predetermined or adaptive optimal value (step 278). The CR_COUNTER_2 for the secondary station $110n$ that responded is set to 0, since the response was valid (step 280). The registration confirmation message, containing the transmit power level adjustment that was calculated in step 278, is sent to the secondary station (step 282). If the registration response is not valid (step 270), then the invalid response flag is set to TRUE (step 271), control passes to "D" (step 214), and the process is repeated.

Figure 6:
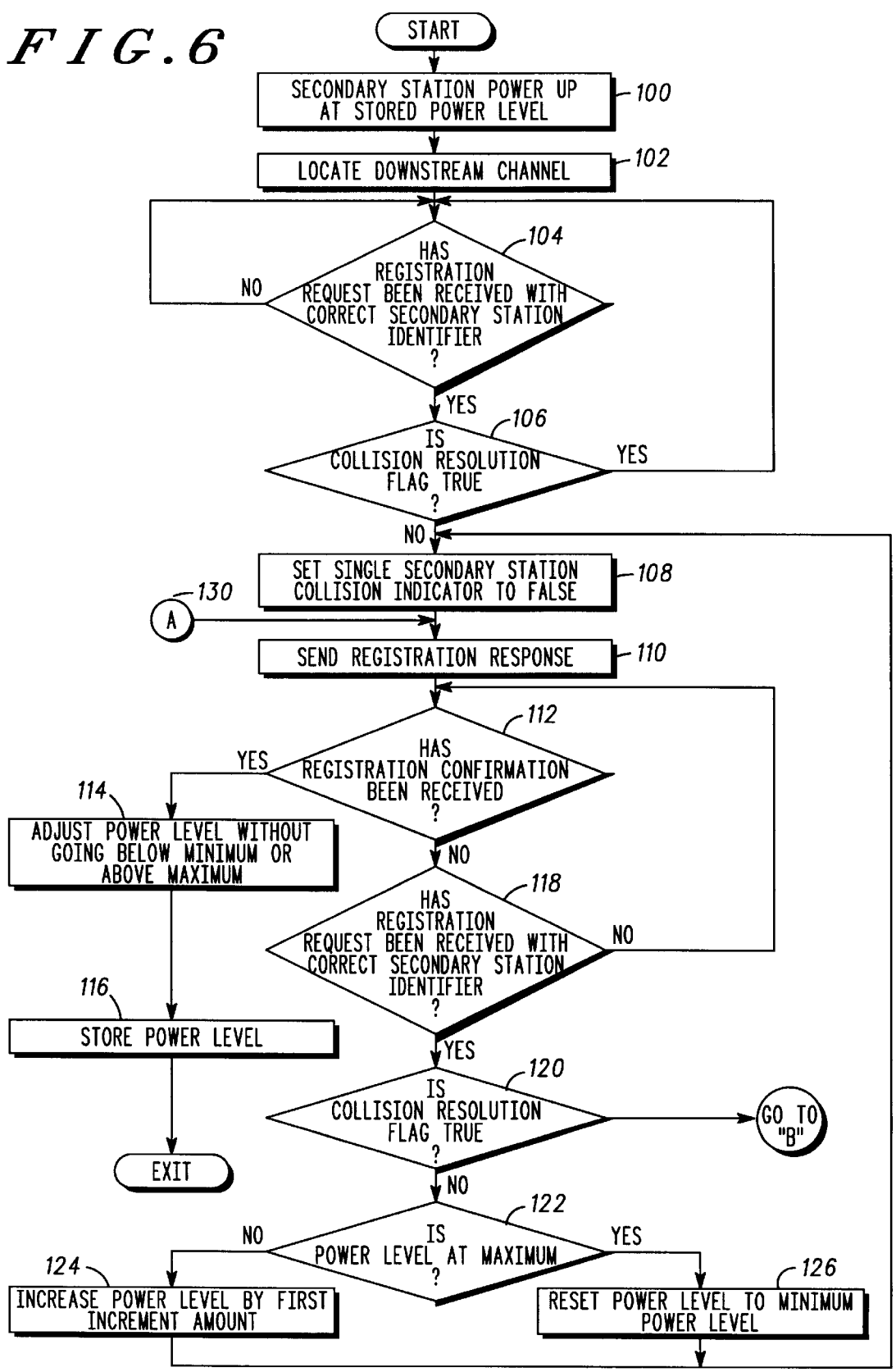
FIG. 6 is a flow chart illustrating the secondary station portion of the method of transmit power leveling.

FIG. 6 is a flow chart illustrating the secondary station $10_n$ portion of the method of transmit power leveling. Beginning with start step 100, the secondary station $10_n$ powers up at a first power level. It then locates a downstream channel (step 102) and waits for a registration request from the primary station which contains its secondary station identifier (step 104).

Registration requests are invitations for one or more secondary stations $10_a$ through $10_n$ to attempt to register, (i.e., gain access to the communications network), which are periodically broadcast by the primary station 8. If a registration request with the collision request indicator flag set to true is received (step 106), then control returns to step 104. This is done because this secondary station $10_n$ was not involved in the previous collision (i.e., it just powered up and has not transmitted anything yet), and therefore, in the preferred embodiment, is not allowed to respond. If the collision request indicator flag tested in step 106 is false, the single secondary station collision indicator flag is set to false (step 108). This flag is used by the secondary station $10_n$ as shown in FIG. 7 step 152 and step 154, and is described in detail below.

The secondary station $10_n$ then sends a registration response at its current transmit power level (step 110). The registration response is part of a handshake with the primary station 8 that identifies the secondary station $10_n$, and requests that the primary station 8 allow access to the communication system. If the secondary station $10_n$ receives a confirmation of the registration (step 112), it adjusts its transmit power level in accordance with the instructions contained in the registration confirmation message, while neither exceeding the maximum allowed power level nor going below the minimum allowed power level (step 114), and stores the transmit power level in memory (step 116).

Alternatively, associated information in addition to the transmit power level may be stored in memory for later use in determining the appropriate transmit power level to use, such as the communication channel number in use, the channel's current state, and the time-of-day. At next power up, the transmit power level stored in the memory of the secondary station is used as the initial transmit power level. Alternatively, probabilistic methods could be applied to the stored information, be it only the transmit power level or the transmit power level with additional associated information, to determine the best transmit power level to use.

Continuing to refer to FIG. 6 step 118, if a subsequent registration request is received with the secondary station identifier, the primary station 8 is assumed to have not properly received the registration response that this secondary sent in step 110. If the collision resolution flag contained in the registration request is not true (step 120), then the primary station 8 did not receive the secondary station $10_n$ registration response. Because the secondary station's transmit power level may require adjustment, the transmit power level of the secondary station $10_n$ is checked to determine if it is at the maximum transmit power level (step 122). If the secondary station $10_n$ transmit power level is not at the maximum, then the transmit power level is increased by a first incremental amount (step 124). This first incremental amount is a predetermined or adaptive gross adjustment, up to but not exceeding the maximum transmit power level allowed. However, if the transmit power level is at the maximum transmit power level, the transmit power level is reset to the lowest possible value (step 126) under the assumption that the secondary station's transmit power level may be too high, and the process is repeated. In step 120, if the collision request flag is true in the registration request received in step 118, then control passes to "B" (step 128) of FIG. 7.

Figure 7:
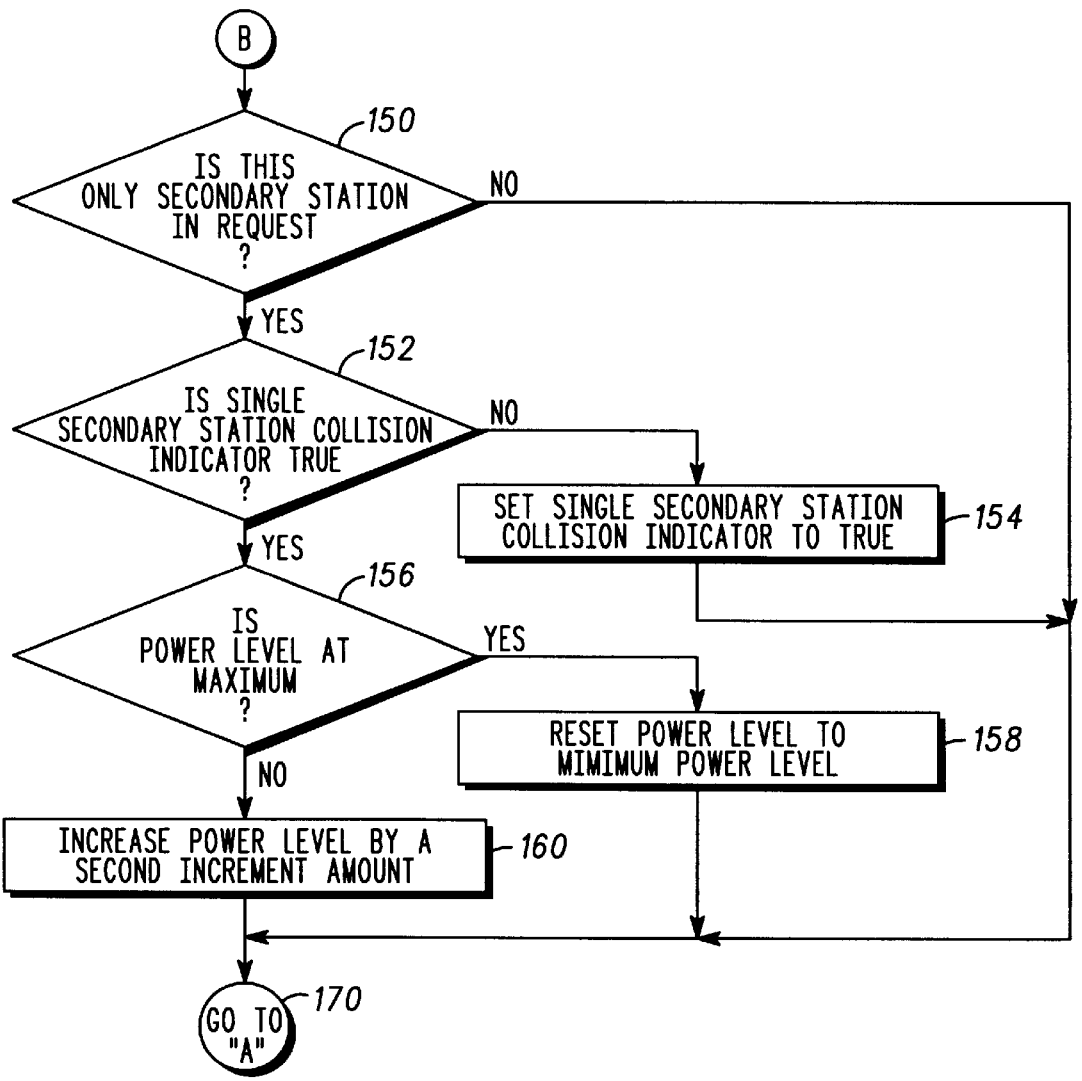
FIG. 7 is a flow chart illustrating the continuation of the secondary station portion of the method of transmit power leveling.

FIG. 7 shows the flow of process if the registration request is received with the collision resolution flag true, and this secondary station $10_n$ was involved in the collision (i.e., transmitted a registration response in response to the last registration request received). If the secondary station $10_n$ is not the only secondary station $10_n$ with a secondary station identifier in the registration request that has the collision resolution flag true (step 150), then control passes to step 170, and then to step 130 of FIG. 6, and a registration response is again sent (step 110 of FIG. 6).

If the secondary station is the only secondary station $10_n$ with a secondary station $10_n$ identifier in the registration request that has the collision resolution flag true, then the single secondary station collision indicator is checked (step 152). The single secondary station collision indicator shows whether it was the only secondary station sending a registration response, but the primary station 8 was unable to receive the response correctly. This indicator is used to ensure that the secondary station $10_n$ does not adjust its transmit power level the first time that it is the only secondary station in a registration request with the collision resolution flag true, since there may indeed have been a collision between this secondary station and some other of the plurality of secondary stations on the previous registration requests.

However, after the secondary station $10_n$ responds to a registration request with the collision resolution flag true in which only its secondary station identifier is contained, if the response is not received by the primary station 8 properly there could not have been a collision since no other secondary stations were allowed to transmit, and the secondary station $10_n$ may infer that this was due to its transmit power level being incorrect. Continuing with step 152, if the single secondary station collision indicator is not true, then it is set to TRUE (step 154), and control passes to step 170, and then to step 130 of FIG. 6, and a registration response is again sent (step 110 of FIG. 6).

Continuing in FIG. 7 with step 152, if the single secondary station collision indicator is TRUE, this indicates that the secondary station $10_n$ could not have been involved in a collision, yet the primary station 8 received the secondary station's $10_n$ registration response improperly, implying that the transmit power level may require adjusting. First, the current transmit power level of the secondary station $10_n$ is tested (step 156). If the transmit power level is at the maximum, then the transmit power level is set to the minimum transmit power level (step 158), and control passes to step 170, and then to step 130 of FIG. 6. The registration response is again sent (step 110 of FIG. 6).

If the current transmit power level is not a maximum (step 156), the transmit power level is increased by a second incremental amount, this second incremental amount being a predetermined or adaptive fine adjustment, up to but not exceeding the maximum transmit power level allowed (step 160), and control passes to step 170, and then to step 130 of FIG. 6, and a registration response is again sent (step 110 of FIG. 6).

Apparent from the discussion above, the apparatus and method in accordance with the present invention provides for quick and reliable selection of the proper transmit power level to be used for transmission, without utilizing a predetermined or fixed transmit power level, without user intervention, and without actual prior knowledge of a designated transmit power level. Upon initial system start up or initialization, an apparatus such as a secondary station $10_n$ may recalculate its transmit power level starting with the lowest possible transmit power level setting. During operation, however, the transmit power level of a particular secondary station $10_a$ through $10_n$ may be adjusted (by the primary station via a protocol message or other signaling) up or down depending on a number of factors such as temperature, communication channel assignment, maintenance or upgrade of the medium, channel noise, and any other factor that affects the ability of the medium to transport information.

All of these adjusted transmit power levels may be stored in memory in the preferred embodiment, so that upon powering up or coming on line subsequent to the initialization, the secondary station will essentially have a listing or library of frequently used transmit power levels stored in its memory, with other associated information stored with each transmit power level adjustment such as time-of-day, channel number used, channel state (e.g., good, bad, etc.), which may be immediately searched to determine what transmit power level to utilize. As a consequence, the apparatus and method of the present invention provides for increased communication system agility, flexibility, and ease of use under conditions of frequent variation in the ability of a communication medium to transport information, or frequent impairment of a communication medium, where transmit power level adjustment may be used to overcome such variation or impairment.

Numerous variations and modifications may be effected without departing from the spirit and scope of the invention. No limitation with respect to the specific methods and apparatus illustrated herein is intended or should be inferred. It is, of course, intended to cover by the appended claims all modifications as fall within the scope of the claims, and the invention is further defined by the following claims.

We claim:

1. A method for setting a transmit power level by a secondary station in a communication system, the secondary station coupled to a primary station by way of a shared channel, the transmit power level falling between a predetermined minimum transmit power level and a predetermined maximum transmit power level, inclusive, the method comprising the steps of:

receiving a first invitation for several of the secondary stations including the secondary station to contend for access to the shared channel;

transmitting a first response at a first transmit power level;

receiving a second invitation for the secondary station to contend for access to the shared channel;

determining whether the second invitation indicates that a first invalid message was received on the shared channel;

transmitting second response at the first transmit power level if the second invitation indicates that the first invalid message was received on the shared channel;

receiving a third invitation for the secondary station to contend for access to the shared channel;

determining whether the third invitation indicates that a second invalid message was received on the shared channel; and if the third invitation indicates that the second invalid message was received on the shared channel, transmitting a third response at a second transmit power level different from the first transmit power level.

2. The method of claim 1 wherein the second transmit power level is equal to one of:

the first transmit power level plus a predetermined transmit power level increment, if the first transmit power level is less than the predetermined maximum transmit power level; and the predetermined minimum transmit power level, if the first transmit power level is equal to the predetermined maximum transmit power level.

3. The method of claim 1 further comprising the steps of:

receiving a confirmation message including a transmit power level adjustment value;

determining a nominal transmit power level based on the second transmit power level and the transmit power level adjustment value; and setting the secondary station transmit power level equal to the nominal transmit power level.

4. The method of claim 3 wherein the step of determining the nominal transmit power level comprises the steps of:

calculating an adjusted transmit power level from the second transmit power level and the transmit power level adjustment value;

setting the nominal transmit power level equal to the adjusted transmit power level, if the adjusted transmit power level is between the predetermined minimum transmit power level and the predetermined maximum transmit power level, inclusive;

setting the nominal transmit power level equal to the predetermined maximum transmit power level, if the adjusted transmit power level is greater than the predetermined maximum transmit power level; and setting the nominal transmit power level equal to the predetermined minimum transmit power level, if the adjusted transmit power level is less than the predetermined minimum transmit power level.

5. The method of claim 3 further comprising the step of:

storing the nominal transmit power level in a secondary station memory.

6. The method of claim 5 further comprising the step of:

storing a channel number in the secondary station memory along with the nominal transmit power level.

7. A method of registering a secondary station in a communication network, the method comprising the steps of:

receiving a first registration request message;

transmitting a first registration response message at a first transmit power level;

receiving a second registration request message indicating one of:

the first registration response was received incorrectly; and the first registration response was undetected;

determining a second transmit power level equal to one of:

the first transmit power level, if the first registration response was received incorrectly; and the first transmit power level plus a predetermined power level increment, if the first registration response was undetected; and transmitting a second registration response at the second transmit power level.

8. The method of claim 7 wherein the first transmit power level is equal to a predetermined initial transmit power level.

9. The method of claim 8 wherein the predetermined initial transmit power level is equal to a predetermined minimum transmit power level.

10. The method of claim 7 wherein the first transmit power level is equal to a transmit power level value stored in a secondary station memory.

11. The method of claim 7 further comprising the steps of:

receiving a third registration request message;

determining a third transmit power level equal to the second transmit power level plus the predetermined power level increment; and transmitting a third registration response at the third transmit power level.

* * * * *